(12) United States Patent
Jiang et al.

(10) Patent No.: US 10,340,758 B2
(45) Date of Patent: Jul. 2, 2019

(54) PERMANENT MAGNET MOTOR

(71) Applicant: JOHNSON ELECTRIC INTERNATIONAL AG, Murten (CH)

(72) Inventors: Mao Xiong Jiang, Shenzhen (CN); Jian Zhao, Shenzhen (CN); Guo Wei Sun, Shenzhen (CN); Yong Li, Shenzhen (CN); Yong Wang, Shenzhen (CN); Hong Jiang Zhao, Shenzhen (CN); Yue Li, Hong Kong (CN)

(73) Assignee: JOHNSON ELECTRIC INTERNATIONAL AG, Murten (CH)

(*) Notice: Subject to any disclaimer, the term of this patent is extended or adjusted under 35 U.S.C. 154(b) by 262 days.

(21) Appl. No.: 14/725,474

(22) Filed: May 29, 2015

(65) Prior Publication Data

US 2015/0349595 A1    Dec. 3, 2015

(30) Foreign Application Priority Data

May 29, 2014    (CN) .......................... 2014 1 0235890

(51) Int. Cl.
| | |
|---|---|
| H02K 21/12 | (2006.01) |
| H02K 1/27 | (2006.01) |
| H02K 3/32 | (2006.01) |
| H02K 5/20 | (2006.01) |
| H02K 21/22 | (2006.01) |
| H02K 1/14 | (2006.01) |
| H02K 1/20 | (2006.01) |

(52) U.S. Cl.
CPC .......... H02K 1/2786 (2013.01); H02K 1/146 (2013.01); H02K 1/20 (2013.01); H02K 3/325 (2013.01); H02K 5/20 (2013.01); H02K 21/222 (2013.01); *H02K 2213/03* (2013.01)

(58) Field of Classification Search
CPC ........ H02K 1/2786; H02K 3/325; H02K 5/20; H02K 21/22; H02K 1/146; H02K 1/20; H02K 2213/03
USPC ........................................ 310/156.01–156.84
See application file for complete search history.

(56) References Cited

U.S. PATENT DOCUMENTS

| | | | | |
|---|---|---|---|---|
| 4,801,832 A | * | 1/1989 | Neumann ............ | H02K 17/205 310/184 |
| 5,825,108 A | * | 10/1998 | De Filippis ............ | H02K 21/22 310/67 R |

(Continued)

FOREIGN PATENT DOCUMENTS

| | | |
|---|---|---|
| CN | 201478968 U | 5/2010 |
| CN | 202513693 U | 10/2012 |

*Primary Examiner* — Thomas Truong
*Assistant Examiner* — Leda T Pham
(74) *Attorney, Agent, or Firm* — Muncy, Geissler, Olds & Lowe, P.C.

(57) ABSTRACT

A permanent magnet motor has a number of permanent magnets forming permanent magnet poles. Each magnet has an outer surface that is an arc surface with a convex middle. An inner surface of the magnet is a curved surface with a concave middle. The curved surface has an arc surface section and two planar surface sections. The arc surface has a pole arc angle α of 0.7 to 0.96, and the ratio of an arc angle β of the arc surface section to the pole arc angle α is 0.15 to 0.35. The shape of the inner surface of the magnet creates uneven air gaps between the rotor poles and the stator core poles. This reduces cogging torque, increases the motor efficiency, and reduces the motor noise.

18 Claims, 10 Drawing Sheets

(56) References Cited

U.S. PATENT DOCUMENTS

| | | | | |
|---|---|---|---|---|
| 6,844,652 B1* | 1/2005 | Chu | ........................ | H02K 1/276 |
| | | | | 310/156.53 |
| 7,656,063 B2* | 2/2010 | Tsukamoto | ........... | H02K 5/1732 |
| | | | | 303/116.4 |
| 8,110,957 B2* | 2/2012 | Murakami | .............. | H02K 1/278 |
| | | | | 310/156.38 |
| 2007/0257572 A1* | 11/2007 | Nakano | .................... | H02K 1/24 |
| | | | | 310/68 D |
| 2008/0150386 A1* | 6/2008 | Huang | ................. | H02K 1/2786 |
| | | | | 310/156.38 |
| 2008/0157619 A1* | 7/2008 | Wu | ........................ | H02K 29/03 |
| | | | | 310/156.48 |
| 2008/0224562 A1* | 9/2008 | Qin | ........................ | H02K 1/265 |
| | | | | 310/216.004 |
| 2010/0277136 A1* | 11/2010 | Snitchler | ................ | H02K 1/165 |
| | | | | 322/59 |

\* cited by examiner

| No. | Name of the Ratio | Minimum Ratio | Maximum Ratio | Preferred Value |
|---|---|---|---|---|
| 1 | L1/L3 | 1.0 | 1.3 | High Value |
| 2 | T3/L3 | 0.8 | 1.0 | Medium Value |
| 3 | T1/L3 | 0.5 | 0.6 | Medium Value |
| 4 | T3/D | 0.07 | 0.1 | High Value |

FIG. 10

| | T3 | T1 | L1 | L3 | L1/L3 | T3/L3 | T1/L3 |
|---|---|---|---|---|---|---|---|
| Unit | mm | mm | mm | mm | | | |
| Traditional Magnetic Conductive Core Lamination | 8 | 5.7 | 15.5 | 9.3 | 1.67 | 0.86 | 0.62 |
| Core Lamination of Present Invention | 9 | 6.2 | 12.8 | 10.3 | 1.25 | 0.88 | 0.6 |
| Scope of the Ratio | | | | | 1.0-1.3 | 0.8-1.0 | 0.5-0.6 |

FIG. 11

|  | Length of the Stacked Lamination | Height of the Permanent magnet pole | Thickness of the Permanent Magnet Pole | Stator Windings | Rotor Speed | Current | Motor Efficiency | Average Motor Efficiency |
|---|---|---|---|---|---|---|---|---|
| Unit | mm | mm | mm |  | rpm | A |  |  |
| Magnetic Core for Motor of Present Invention | 10 | 16 | 5 | Ø1.25×24.5 | 2030 | 18.79 | 82.51% | 82.11% |
|  | 10 | 16 | 5 | Ø1.25×24.5 | 2016 | 18.63 | 82.60% |  |
|  | 10 | 16 | 5 | Ø1.25×24.5 | 2025 | 18.72 | 82.56% |  |
|  | 10 | 16 | 5 | Ø1.25×24.5 | 2004 | 18.71 | 81.80% |  |
|  | 10 | 16 | 5 | Ø1.25×24.5 | 2025 | 18.96 | 81.57% |  |
|  | 10 | 16 | 5 | Ø1.25×24.5 | 2017 | 18.88 | 81.59% |  |
| Traditional Stator Core | 10 | 16 | 5 | Ø1.25×24.5 | 2041 | 19.84 | 78.63% | 78.76% |
|  | 10 | 16 | 5 | Ø1.25×24.5 | 2023 | 19.58 | 78.89% |  |
| Difference of average efficiency between the motor according to the present invention and traditional motor both of which have similar structure except different stator cores |  |  |  |  |  |  |  | 3.35% |

FIG. 12

PERMANENT MAGNET MOTOR

CROSS REFERENCE TO RELATED APPLICATIONS

This non-provisional patent application claims priority under 35 U.S.C. § 119(a) from Patent Application No. 201410235890.4 filed in The People's Republic of China on May 29, 2014, the entire contents of which are hereby incorporated by reference.

FIELD OF THE INVENTION

This invention relates to electric motors and in particular, to a permanent magnet motor having an uneven air gap between the rotor and stator.

BACKGROUND OF THE INVENTION

Electric motors have a stator and a rotor which is rotatable with respect to the stator. In an outer rotor motor the rotor is disposed around the stator. In a brushless DC motor the rotor has magnetic poles formed or created by one or more permanent magnets, while the stator has windings wound about the stator core to form the magnetic poles of the stator. The stator core is usually formed by a stack of core laminations of silicon steel to provide the magnetic flux path of the stator.

The permanent magnet poles of the rotor are usually formed by arc-shaped or inclined magnets, with even gaps formed between the magnets and teeth of the stator core. The motor with this configuration has a high cogging torque and poor motor efficiency.

In addition, as shown in FIG. 13, a core lamination 100 of a traditional stator core include an annular portion 130, a plurality of teeth 150 extending radially outwardly from the annular portion 130, and a tip 170 disposed at a distal end of each tooth 150. Each tooth 150 is elongated with a large height, i.e. a large distance from a root (where the tooth 150 connects to the annular portion 130) of the tooth to the tip 170. This results in a long magnetic path and hence a high magnetic resistance. The magnetic flux passing through the stator core formed by the core laminations 100 generates a large amount of heat, thus causing a significant iron loss of the motor and hence a poor efficiency of the motor.

SUMMARY OF THE INVENTION

Thus, there is a desire for a motor with enhanced efficiency and reduced cogging torque.

Accordingly, in one aspect thereof, the present invention provides a permanent magnet for a pole of a motor, comprising an outer surface and an inner surface, the outer surface is an arc surface with a convex middle, and the inner surface is a curved surface with a concave middle, wherein the curved surface comprises an arc surface section and two planar surface sections, the arc surface section is connected between the two planar surface sections to form the whole curved surface, the outer surface of the magnet has an arc angle $\alpha$ in the range of 0.7 rad to 0.96 rad, and the ratio of an arc angle $\beta$ of the arc surface section of the inner surface to the arc angle $\alpha$ of the outer surface of the magnet is in the range of 0.15 to 0.35.

Preferably, an angle $\theta$ formed between a radial line of an arc surface section passing through the point of connection of the arc surface section and a corresponding planar surface section and the corresponding planar surface section is in the range of 85 to 95 degrees.

Preferably, the outer surface and the inner surface are connected by an arc transition surface at each circumferential end of the permanent magnet.

Preferably, the permanent magnet has the same thickness at the two circumferential ends thereof.

According to a second aspect, the present invention provides a motor comprising a stator and a rotor rotatable relative to the stator, the stator comprising a stator core having a plurality of teeth, stator windings wound around the stator core, and a winding bracket for insulating the stator windings from the stator core, the rotor comprising an outer housing and a plurality of permanent magnet fixed to an inner surface of the outer housing forming rotor poles, the permanent magnet poles surrounding the stator core and the stator windings, wherein the permanent magnets comprise an outer surface being an arc surface with a convex middle, and an inner surface being a curved surface with a concave middle, the curved surface having an arc surface section and two planar surface sections, the arc surface section being connected between the two planar surface sections to form the whole curved surface, wherein the outer surface of the magnet has an arc angle $\alpha$ in the range of 0.7 rad to 0.96 rad, and the ratio of an arc angle $\beta$ of the arc surface section of the inner surface to the arc angle $\alpha$ of the magnet is in the range of 0.15 to 0.35, and wherein the ratio of a maximum value to an minimum value of an air gap between each permanent magnet and a corresponding tooth of the stator core is in the range of 3 to 7.

Preferably, an angle $\theta$ formed between a radial line of an arc surface section passing through the point of connection of the arc surface section and a corresponding planar surface section and the corresponding planar surface section is in the range of 85 to 95 degrees.

Preferably, the outer surface and the inner surface are connected by an arc transition surface at each circumferential end of the permanent magnet.

Preferably, the permanent magnet has the same thickness at the two circumferential ends thereof.

Preferably, the ratio of the maximum value to the minimum value of the air gap is 5.

Preferably, the winding bracket is formed over an outer surface of the stator core by an over-molding process.

Preferably, an end wall of the outer housing of the rotor has a plurality of ventilation openings, ventilation slots are defined in the stator core, and the ventilation slots are in flow communication with the ventilation openings.

Preferably, the arc of the inner surface of the permanent magnet pole and the arc of the outer surface of the permanent magnet pole are concentric.

Preferably, the stator core comprises an outer annular portion from which the teeth extend radially outwardly, an inner annular portion, a plurality of connecting arms interconnecting the outer annular portion and the inner annular portion, a tip disposed at a distal end of each tooth, and a circumferential width of each connecting arm is less than a circumferential width of each tooth.

Preferably, the outer surface of the outer annular portion comprises a plurality of planar surface sections, and side surfaces of the teeth are substantially perpendicular to the outer surface of the outer annular portion.

Preferably, the ventilation slots are defined between adjacent connecting arms of the stator core, and the ventilation slots are in flow communication with the ventilation openings.

Preferably, a width of each tooth is defined as T3, a height of each tooth is defined as L1, a circumferential distance between the roots of adjacent teeth is defined as L3, the ratio of L1 to L3 is in the range of 1.0 to 1.3, and the ratio of T3 to L3 is in the range of 0.8 to 1.0.

Preferably, a radial width of the outer annular portion is defined as T1, the ratio of the T1 to L3 is in the range of 0.5 to 0.6; an outer diameter of the stator core is defined as D, and the ratio of T3 to D is in the range of 0.07 to 0.1.

In view of the foregoing, the shape of the inner and outer surfaces of the permanent magnets is modified such that uneven air gaps are formed between the permanent magnet poles of the rotor and the magnetic poles of the stator. This reduces the cogging torque of the motor, thus increasing the motor efficiency, and reducing the motor noise. In addition, the motor efficiency is increased by modifying the structure of the stator core to include the inner annular portion, the connecting arms, the outer annular portion, the teeth and tips. In the magnetic core, the height of the teeth is shortened, such that the magnetic path is shortened and hence the magnetic resistance is reduced. The improvement on the construction of the stator core effectively reduces the magnetic resistance of the stator core and, as a result, reduces the iron loss of the motor and increases the motor efficiency.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 10 shows the size ratio values relating to core laminations that form the stator core of the present invention;

FIG. 11 is a chart showing the comparison of the size ratio values relating to the core lamination of the stator core of the present invention and the traditional core lamination;

FIG. 12 is a chart showing the comparison of the efficiency of the motor employing the magnetic core according to the present invention and the motor employing the traditional stator core.

DETAILED DESCRIPTION OF THE PREFERRED EMBODIMENTS

Figure 1:
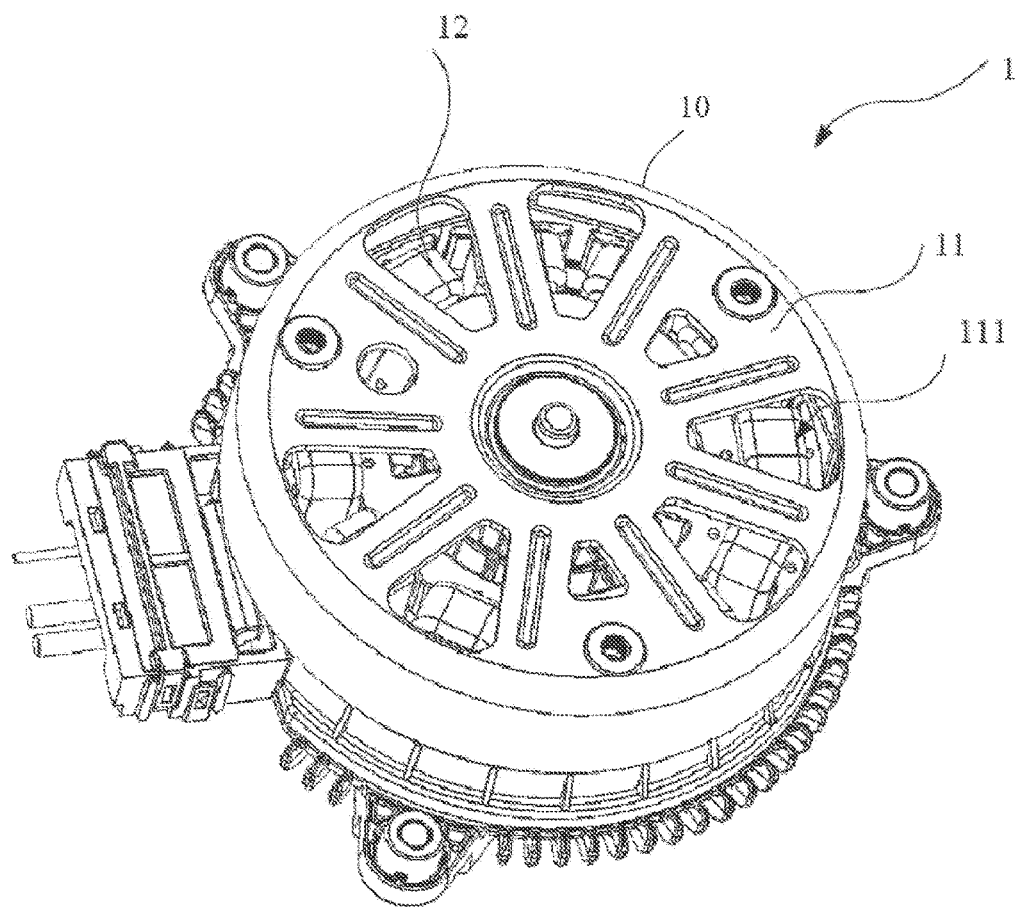
FIG. 1 is a perspective view of a motor according to one embodiment.
Figure 2:
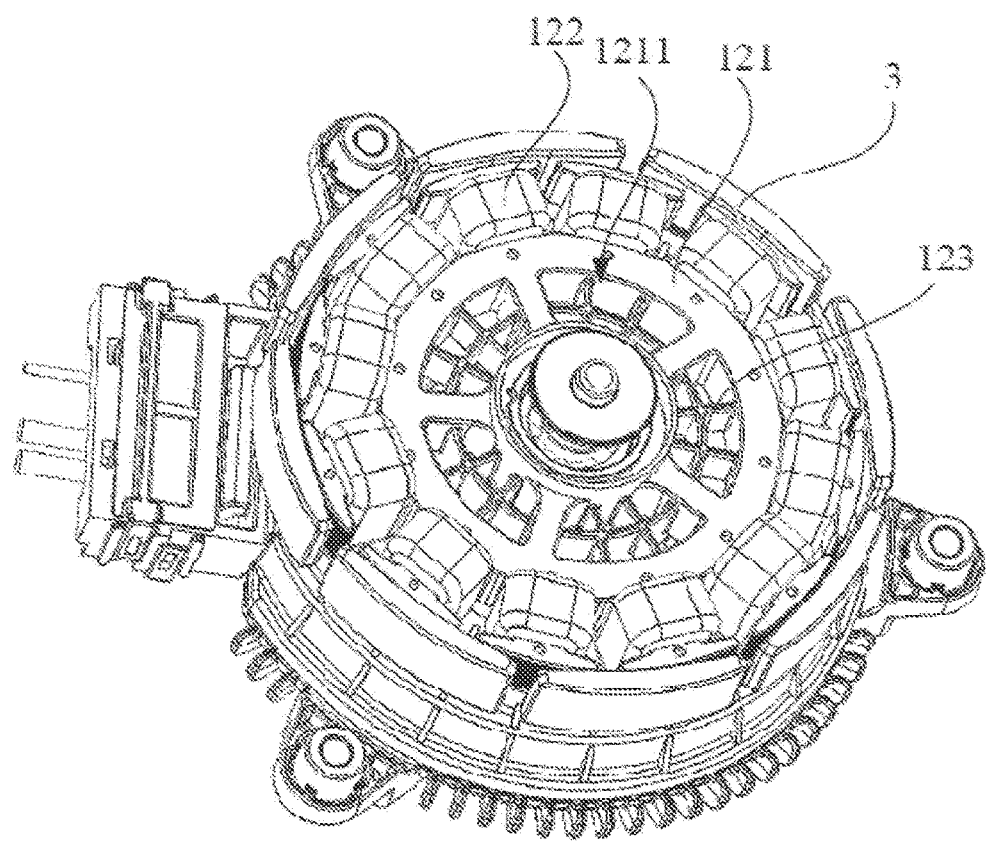
FIG. 2 illustrates the motor of FIG. 1 with an outer housing omitted.
Figure 3:
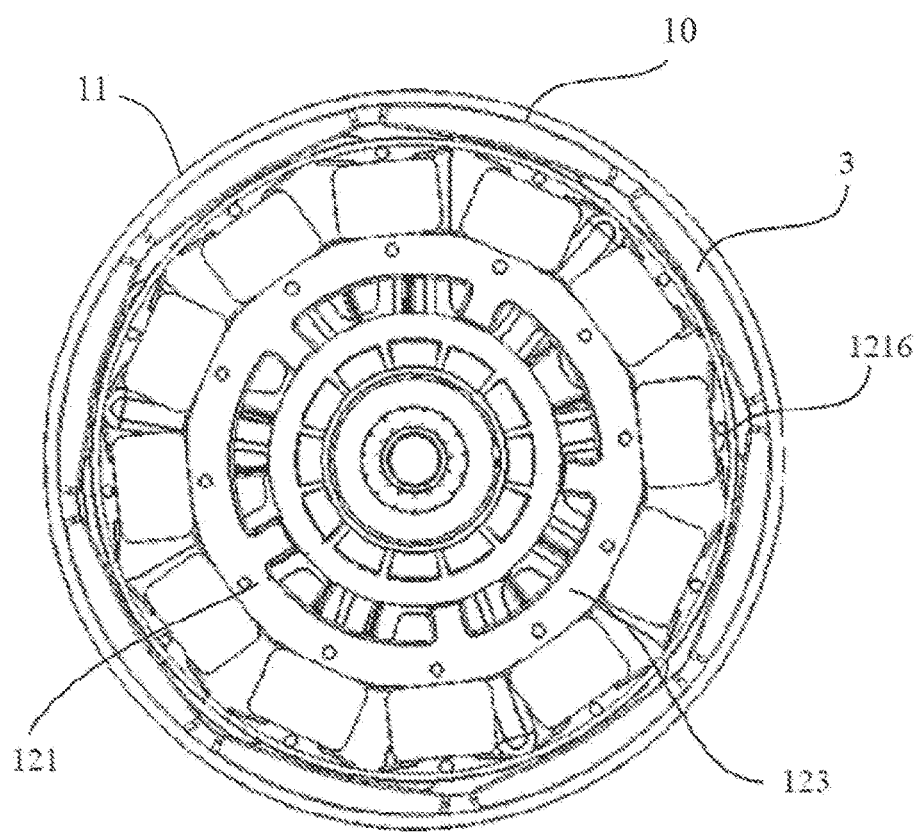
FIG. 3 is a cross-sectional view of the motor.

Referring to FIG. 1 through FIG. 3, a motor 1 in accordance with the preferred embodiment of the present invention includes a stator 12 and a rotor 10 rotatable relative to the stator. The rotor 10 includes an outer housing 11 and a plurality of permanent magnets 3 fixed to an inner surface of the outer housing 11 forming permanent magnet poles of the rotor. The stator 12 includes a stator core 121, stator windings 122 wound around the stator core 121, and a winding bracket 123 for insulating the stator core 121 from the stator windings 122. The winding bracket 123 is formed over an outer surface of the stator core 121 by an over-molding process, but exposes surfaces of tooth tips 1216 of the stator core 121 that confront the permanent magnet poles 3. The permanent magnet poles 3 are arranged surrounding an outer side of the stator core 121 and stator windings 122.

An end wall of the outer housing 11 of the rotor has a plurality of ventilation openings 111. Correspondingly, ventilation slots 1211 are defined between adjacent connecting arms of the stator core 121, which are in flow communication with the ventilation openings 111. This arrangement facilitates heat dissipation from an interior of the motor.

Figure 4:
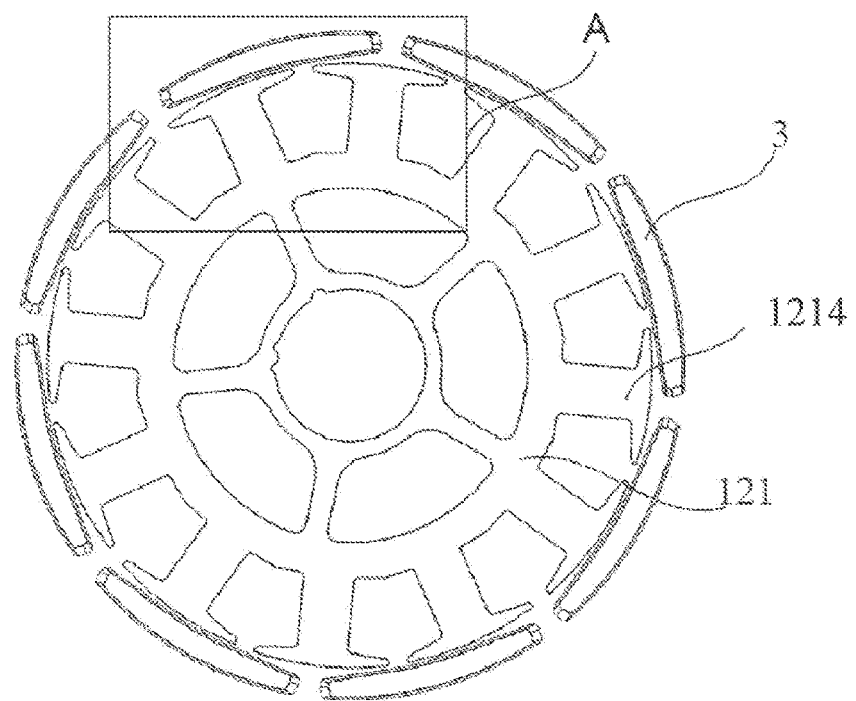
FIG. 4 illustrates permanent magnet poles and a stator core of the motor.
Figure 5:
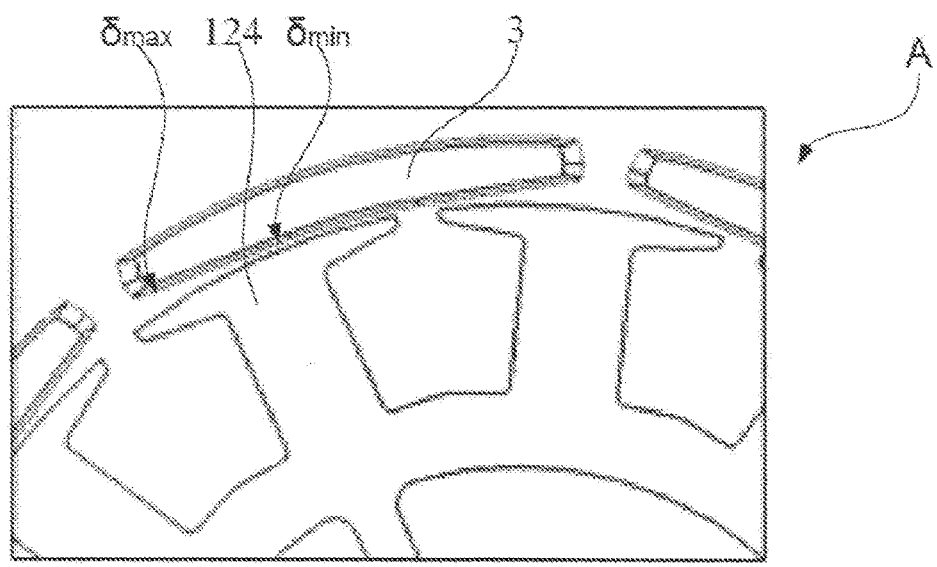
FIG. 5 is an enlarged view of the portion A of FIG. 4.

As shown in FIG. 4 and FIG. 5, an air gap is formed between an inner surface of each permanent magnet pole 3 and an outer surface of a tip 1216 of an adjacent tooth 1214 of the stator core 121. The ratio of a maximum value of the air gap δmax to a minimum value of the air gap δmin is 3-7, preferably, 5. As such, the air gaps formed between the permanent magnets 3 and their corresponding teeth 124 of the stator core 121 are uneven, thus reducing the cogging torque and hence the noise during motor operation.

Figure 6:
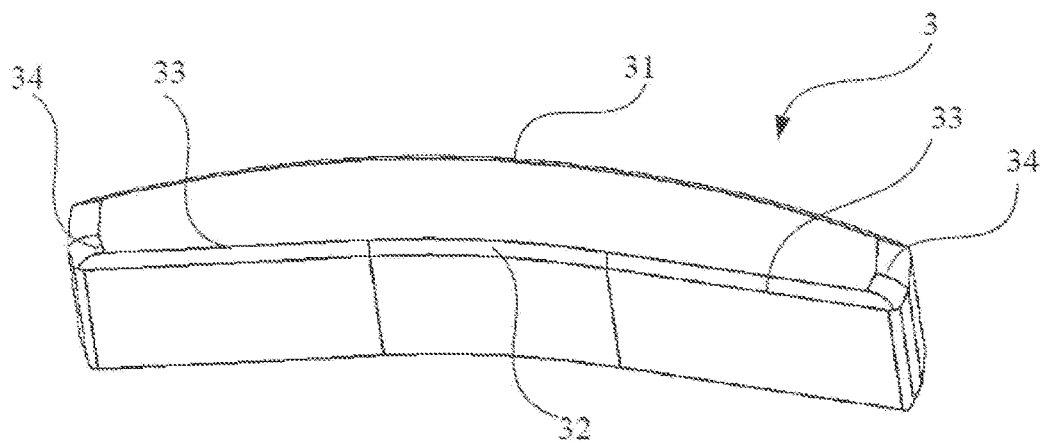
FIG. 6 is a perspective view of a permanent magnet of FIG. 4.
Figure 7:
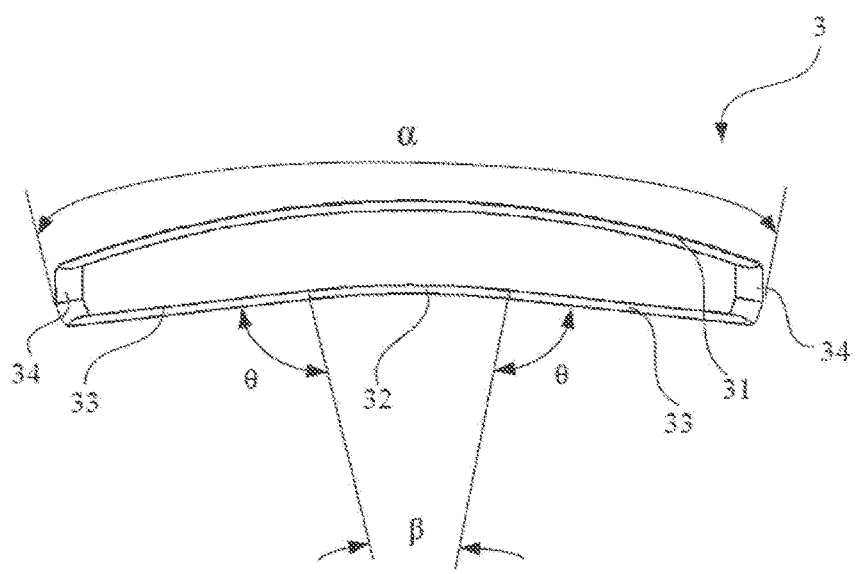
FIG. 7 is a plan view of the permanent magnet of FIG. 6.

Specifically, as shown in FIG. 6 and FIG. 7, each magnet 3 of the rotor poles has an arc outer surface 31 with a convex middle. The inner surface of the magnet is a curved surface with a concave middle, including an arc surface section 32 and two plane surface sections 33. The arc surface section 32 is connected between the two planar surface sections 33 to form the whole curved surface. The arc outer surface 31 has an arc angle α of 0.7-0.96 rad, and the ratio of an arc angle β of the arc surface section 32 of the inner surface to the arc angle α of the magnet is 0.15-0.35. Permanent magnet poles configured as such can increase the utilization rate of the available gap, thereby further enhancing the motor efficiency.

Specifically, the arc of the inner surface (i.e. the arc surface section 32) of the permanent magnet 3 and the arc of the outer surface (i.e. the arc outer surface 31) of the permanent magnet 3 are concentric. Each planar surface section 33 is at an angle θ of 85-95 degrees to a radius of one corresponding arc surface section 32 at an end thereof that connects to the planar surface section 33. In addition, the outer surface (i.e. the arc outer surface 31) and the inner surface (i.e. the curved surface formed by one arc surface section 32 and two planar surface sections 33) of the permanent magnet 3 are interconnected by an arc transition surface 34 at each circumferential end of the permanent magnet. More specifically, the permanent magnet 3 has a thickness gradually decreasing from the middle towards the circumferential ends, and has the same thickness at the opposite ends, which facilitates steady operation of the motor.

Figure 8:
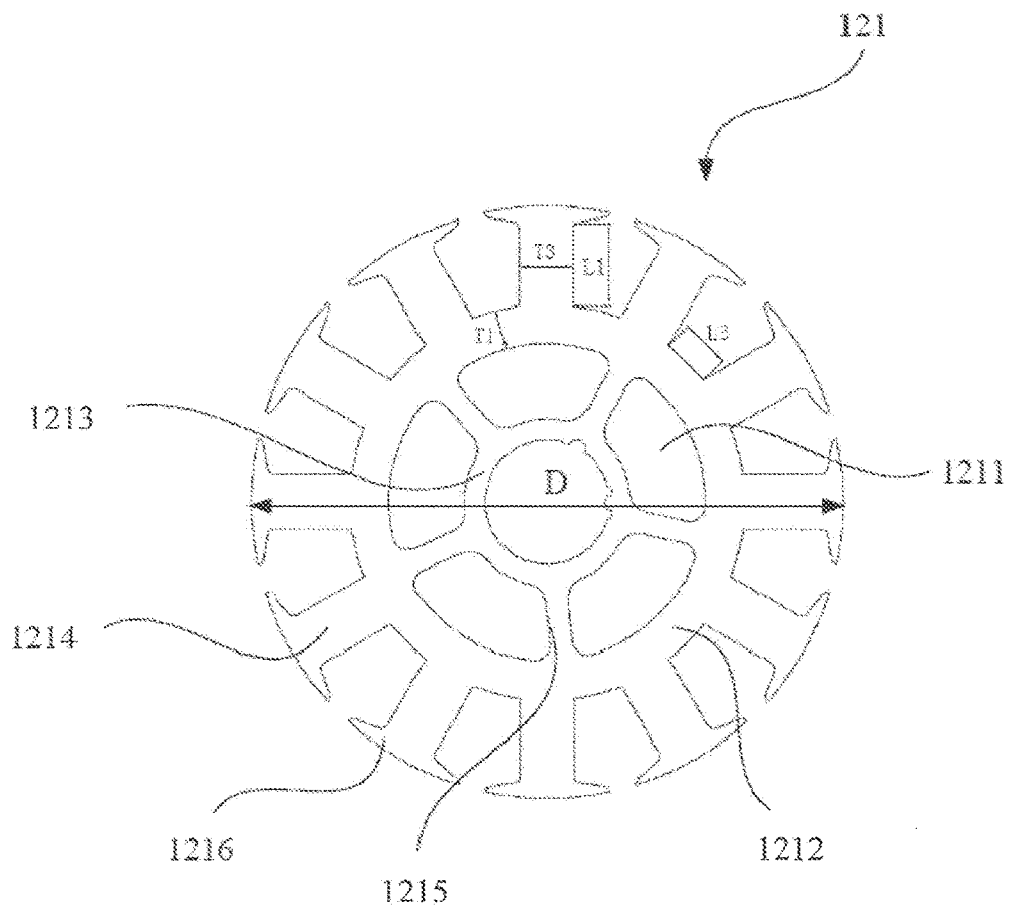
FIG. 8 illustrates the stator core of FIG. 4.

As shown in FIG. 8, the stator core has an improved structure. The stator core 121 includes an outer annular portion 1212, an inner annular portion 1213, a plurality of teeth 1214 extending radially outwardly from the outer annular portion 1212, a plurality of connecting arms 1215 interconnecting the outer annular portion 1212 and the inner annular portion 1213, and a tip 1216 disposed at a distal end of each teeth 1214. The width of each connecting arm 1215 is less than the width of each tooth 1214 in a circumferential direction of the motor, and each tip 1216 extends in the circumferential direction of the motor at the distal end of the corresponding tooth 1214. Preferably, outer surfaces of all the tips 1216 are located on a hypothetical circle that is centered at the center of the rotor.

In one embodiment, an outer surface of the outer annular portion 1212 of the stator core 121 includes a plurality of arc surface sections that are concentric with the inner annular portion 1213, and the teeth 1214 extend radially outwardly from the outer surface of the outer annular portion 1212.

Figure 9:
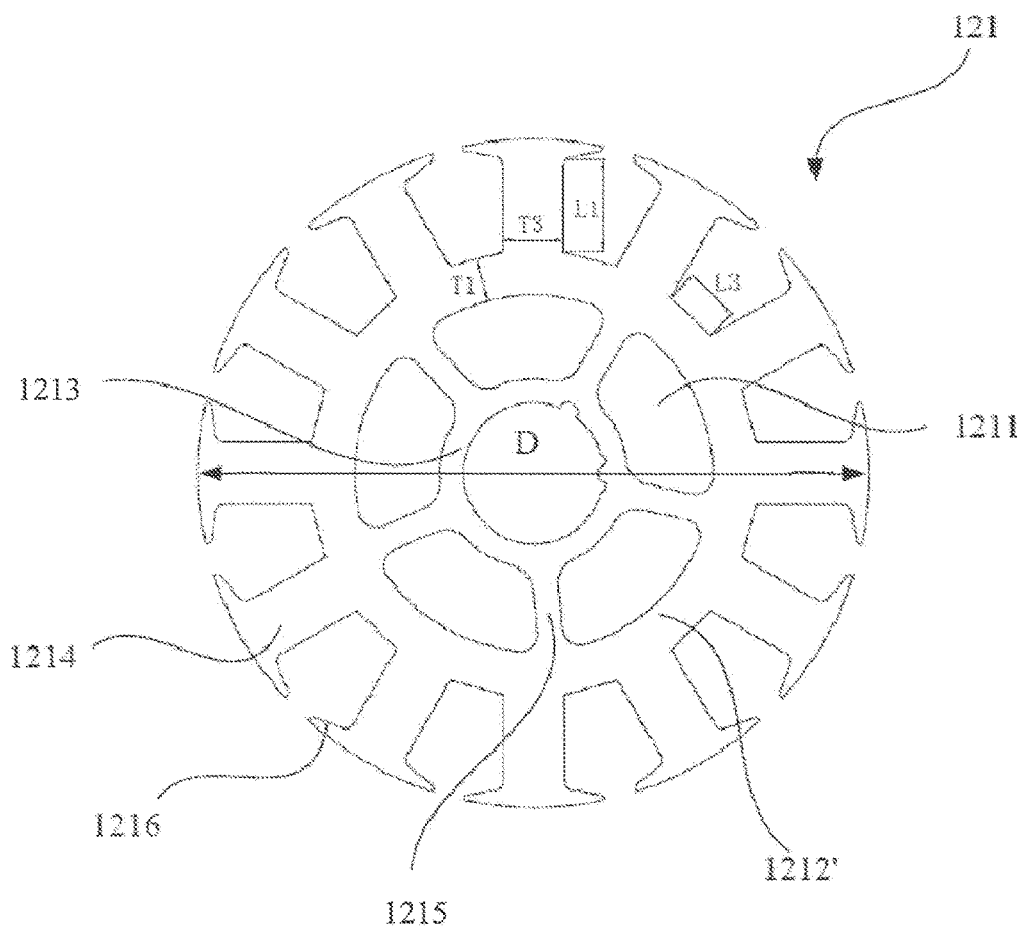
FIG. 9 illustrates a stator core according to another embodiment.

As shown in FIG. 9, in another embodiment, the outer surface of the outer annular portion 1212' of the stator core 121 includes a plurality of planar surface sections. Side surfaces of the teeth 1214 are substantially perpendicular to the outer surface of the outer annular portion 1212', and the angle between the side surfaces of the teeth 1214 and the outer surface of the outer annular portion 1212' may be in the range of 85 to 100 degrees.

The outer annular portion 1212' has a radial width T1, each tooth 1214 has a width T3, each tooth 1214 has a height L1, i.e. the distance L1 from a tooth root (where the tooth 1214 connects to the outer annular portion 1212) to the tip 1216, and roots of adjacent teeth 1214 have a circumferential distance L3 there between. Referring also to FIG. 10, the ratio of L1 to L3 is set to be in the range of 1.0 to 1.3, and a higher ratio is preferable. The ratio of T3 to L3 is set to be in the range of 0.8 to 1.0, and a mid-range ratio is preferable. The ratio of T1 to L3 is set to be in the range of 0.5 to 0.6, and a mid-range ratio is preferable. The stator core 22 has an outer diameter D, and the ratio of T3 to D is set to be in the range of 0.07 to 0.1.

Referring to FIG. 11, in a motor that employs the magnetic core of the present invention as a stator core, the radial width T1 of the annular portion is 6.2 mm, the width T3 of each tooth is 9 mm, the height L1 of each tooth is 12.8 mm, and the circumferential distance L3 between the roots of adjacent teeth is 10.3 mm. The ratio of L1 to L3 is 1.25, the ratio of T3 to L3 is 0.88, and the ratio of T1 to L3 is 0.6.

Figure 13:
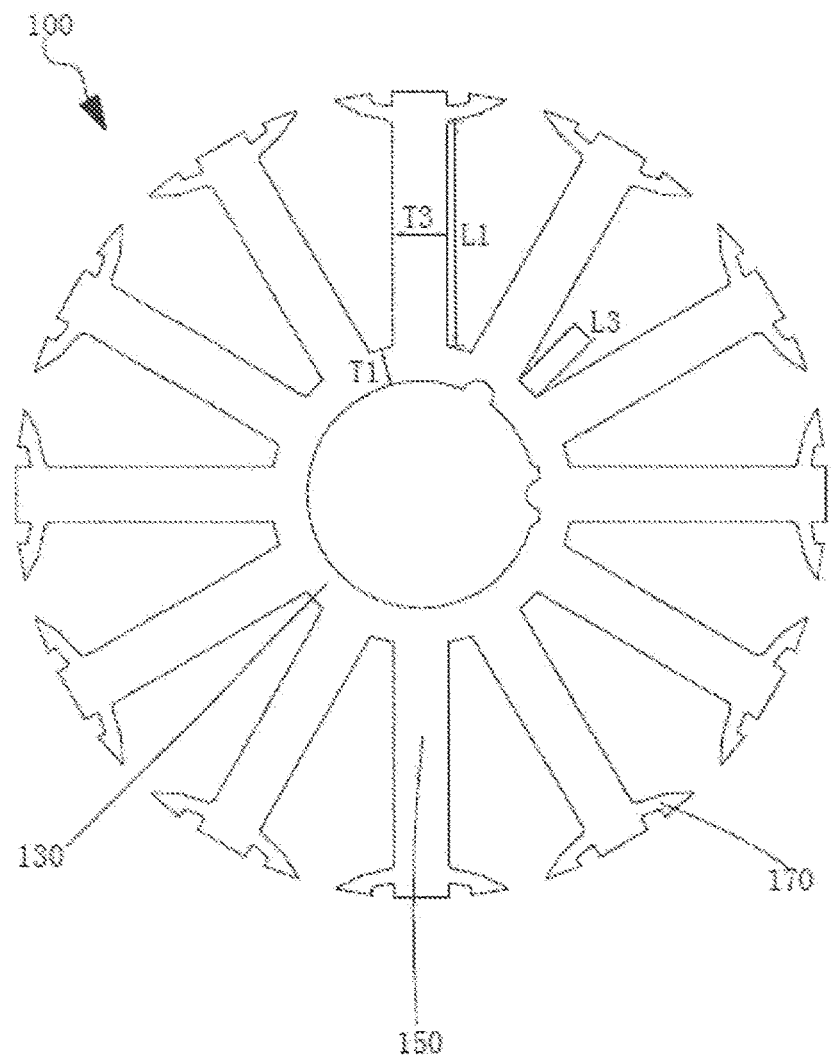
FIG. 13 illustrates the traditional stator core.

Referring to FIG. 13, in the same motor model that employs the traditional stator core, the radial width T1 of an annular portion 130 of a core lamination 100 of the stator core is 5.7 mm, the width T3 of each tooth 150 is 8 mm, the height L1 of each tooth 150 is 15.5 mm, and the circumferential distance L3 between the roots of adjacent teeth 150 is 9.3 mm. The ratio of L1 to L3 is 1.67, which exceeds the range of 1.0 to 1.3 of the present invention; the ratio of T3 to L3 is 0.86; and the ratio of T1 to L3 is 0.62, which exceeds the range of 0.5 to 0.6 of the present invention. In comparison with the traditional core lamination 100, the core lamination of the present invention is achieved by increasing the width T3 of the teeth 1214, the radial width T1 of the outer annular portion 1212, and the circumferential distance L3 between the roots of adjacent teeth 1214, and decreasing the height L1 of the teeth 15. The new core lamination with optimized magnetic circuit shortens the magnetic path in comparison with the traditional core lamination 100, thereby reducing the magnetic resistance and iron loss of the motor and hence enhancing the efficiency of the motor.

Referring to FIG. 12, as verified by experiments, for motors having the same rotor, and stator windings with the same wire diameter and turns, the motor having the magnetic core of the present invention has an average efficiency of 82.11%, while the motor having the traditional magnetic core has an average efficiency of 78.76%. Therefore, the use of the magnetic core of the present invention improves the efficiency of the motor by 3.35%.

The core lamination may be formed by stamping a silicon steel sheet or a nickel-iron soft magnetic alloy sheet with good magnetically conductive capability. Alternatively, the core lamination may be formed by other magnetically conductive materials.

In summary, in the motor of the present invention, the shape of the inner and outer surfaces of the permanent magnet poles is modified such that uneven air gaps are formed between the permanent magnet poles of the rotor and the magnetic poles of the stator core. This reduces the cogging torque of the motor, increases the motor efficiency, and reduces the motor noise. In addition, the motor efficiency is increased by modifying the structure of the stator core to include the inner annular portion, the connecting arms, the outer annular portion, the teeth and tips. In the magnetic core, the height of the teeth is shortened, such that the magnetic path is shortened and hence the magnetic resistance is reduced. In particular, the ratio of the tooth height L1 of the core laminations of the magnetic core to the circumferential distance L3 between the roots of adjacent teeth is set to be in the range of 1.0 to 1.3, the ratio of the width T3 of each tooth to the circumferential distance L3 between the roots of adjacent teeth is set to be in the range of 0.8 to 1.0, and the ratio of the radial width T1 of the annular portion to the circumferential distance L3 between the roots of adjacent teeth is set to be in the range of 0.5 to 0.6, which effectively reduces the magnetic resistance of the stator core and, as a result, reduces the iron loss of the motor and increases the motor efficiency. It should be understood that the magnetic core of the present invention can also be used in a rotor of a motor.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A permanent magnet for a pole of a motor, comprising an outer surface and an inner surface, the outer surface is an arc surface with a convex middle, and the inner surface is a curved surface with a concave middle, wherein the curved surface comprises an arc surface section and two planar surface sections, the arc surface section is connected between the two planar surface sections to form the whole curved surface, the arc of the inner surface of the permanent magnet and the arc of the outer surface of the permanent magnet are concentric, a ratio of an arc angle β of the arc surface section of the inner surface to an arc angle α of the outer surface of the permanent magnet is in the range of 0.15 to 0.35.

2. The permanent magnet of claim 1, wherein an angle θ formed between a radial line of an arc surface section passing through the point of connection of the arc surface section and a corresponding planar surface section and the corresponding planar surface section is in the range of 85 to 95 degrees.

3. The permanent magnet of claim 1, wherein the outer surface and the inner surface are connected by an arc transition surface at each circumferential end of the permanent magnet.

4. The permanent magnet of claim 1, wherein the permanent magnet has the same thickness at circumferential ends thereof.

5. The motor of claim 1, wherein the arc angle α of the outer surface of the permanent magnet is in the range of 0.7 rad to 0.75 rad.

6. A motor comprising a stator and a rotor rotatable relative to the stator,
the stator comprising a stator core having a plurality of teeth, stator windings wound around the stator core, and a winding bracket for insulating the stator windings from the stator core,
the rotor comprising an outer housing and a plurality of permanent magnets fixed to an inner surface of the outer housing forming permanent magnet poles, the permanent magnets surrounding the stator core and the stator windings,
wherein the permanent magnets comprise an outer surface being an arc surface with a convex middle, and an inner surface being a curved surface with a concave middle, the curved surface having an arc surface section and two planar surface sections, the arc surface section being connected between the two planar surface sections to form the whole curved surface,
wherein the arc of the inner surface of the permanent magnet and the arc of the outer surface of the permanent magnet are concentric, a ratio of an arc angle β of the arc surface section of the inner surface to an arc angle α of the outer surface of the permanent magnet is in the range of 0.15 to 0.35, and
wherein the ratio of a maximum value to an minimum value of an air gap between the inner surface of each permanent magnet and a corresponding tooth of the stator core is in the range of 3 to 7.

7. The motor of claim 6, wherein an angle θ formed between a radial line of an arc surface section passing through the point of connection of the arc surface section and a corresponding planar surface section and the corresponding planar surface section is in the range of 85 to 95 degrees.

8. The motor of claim 6, wherein the outer surface and the inner surface are connected by an arc transition surface at each circumferential end of the permanent magnet.

9. The motor of claim 6, wherein the permanent magnet has the same thickness at circumferential ends thereof.

10. The motor of claim 6, wherein the ratio of the maximum value to the minimum value of the air gap is 5.

11. The motor of claim 6, wherein the winding bracket is formed over an outer surface of the stator core by an over-molding process.

12. The motor of claim 6, wherein an end wall of the outer housing of the rotor defines a plurality of ventilation openings, ventilation slots are defined in the stator core, and the ventilation slots are in flow communication with the ventilation openings.

13. The motor of claim 6, wherein the stator core comprises an outer annular portion from which the teeth extend radially outwardly, an inner annular portion, a plurality of connecting arms interconnecting the outer annular portion and the inner annular portion, a tip disposed at a distal end of each tooth, and a circumferential width of each connecting arm is less than a circumferential width of each tooth.

14. The motor of claim 13, wherein the outer surface of the outer annular portion comprises a plurality of planar surface sections, and side surfaces of the teeth are substantially perpendicular to the outer surface of the outer annular portion.

15. The motor of claim 13, wherein an end wall of the outer housing of the rotor has a plurality of ventilation openings, ventilation slots are defined between adjacent connecting arms of the stator core, and the ventilation slots are in flow communication with the ventilation openings.

16. The motor claim 13, wherein a width of each tooth is defined as T3, a height of each tooth is defined as L1, a circumferential distance between the roots of adjacent teeth is defined as L3, the ratio of L1 to L3 is in the range of 1.0 to 1.3, and the ratio of T3 to L3 is in the range of 0.8 to 1.0.

17. The motor of claim 16, wherein a radial width of the outer annular portion is defined as T1, the ratio of the T1 to L3 is in the range of 0.5 to 0.6; an outer diameter of the stator core is defined as D, and the ratio of T3 to D is in the range of 0.07 to 0.1.

18. The motor of claim 6, wherein the arc angle α of the outer surface of the permanent magnet is in the range of 0.7 rad to 0.75 rad.

* * * * *